US005357361A

United States Patent [19]

Nishizawa

[11] Patent Number: 5,357,361

[45] Date of Patent: Oct. 18, 1994

[54] DISCRIMINATING LIGHT-EMITTING OPTICAL APPARATUS

[76] Inventor: Jun-ichi Nishizawa, 6-16, Komegafukuro 1-chome, Aoba-ku, Sendai-shi, Miyagi-ken, Japan

[21] Appl. No.: 896,370

[22] Filed: Jun. 10, 1992

[30] Foreign Application Priority Data

Jul. 15, 1991 [JP] Japan .................................. 3-198265

[51] Int. Cl.[5] .............................................. H04B 10/00

[52] U.S. Cl. .................................... 359/142; 359/155; 340/539; 340/568; 340/825.49

[58] Field of Search ......................... 359/155, 142–145, 359/190–191; 340/539, 568, 573, 825.49

[56] References Cited

U.S. PATENT DOCUMENTS

| | | | |
|---|---|---|---|
| 4,218,138 | 8/1980 | Robertsson | 359/155 |
| 4,476,469 | 10/1984 | Lander | 340/825.49 |
| 4,598,272 | 7/1986 | Cox | 340/825.49 |
| 4,814,742 | 3/1989 | Morita et al. | 359/144 |
| 4,837,568 | 6/1989 | Snaper | 359/155 |
| 4,990,892 | 2/1991 | Guest et al. | 340/825.49 |
| 5,144,301 | 9/1992 | Jackson et al. | 340/539 |

FOREIGN PATENT DOCUMENTS

| | | | |
|---|---|---|---|
| 0027074 | 4/1981 | European Pat. Off. . | |
| 0255580 | 2/1988 | European Pat. Off. . | |
| 0172985 | 7/1988 | Japan | 340/825.49 |
| 2091462 | 7/1982 | United Kingdom . | |
| 2174222 | 10/1986 | United Kingdom . | |
| 2249649 | 5/1992 | United Kingdom . | |

*Primary Examiner*—Richard E. Chilcot, Jr.
*Assistant Examiner*—K. Negash
*Attorney, Agent, or Firm*—Fish & Richardson

[57] ABSTRACT

A discriminating light-emitting apparatus comprises a transmitting unit capable of optionally setting a coded optical signal or a signal having a specific wavelength, and a receiving unit responsive only to the optionally coded optical signal or the signal having the specific wavelength issued from the transmitting unit, to execute display. Display on the receiving unit is executed in such a manner that one or a plurality of light emitting section or sections is or are turned on and off.

21 Claims, 6 Drawing Sheets

DISCRIMINATING LIGHT-EMITTING OPTICAL APPARATUS

BACKGROUND OF THE INVENTION

The present invention relates to a discriminating light-emitting apparatus in which, when a coded signal or a signal having a specific wavelength is issued or generated from a transmitting device, a light emitting section of a receiving device receiving the aforesaid signal is turned on or off, to remark or make conspicuous a specific article on which the receiving device is mounted or rested, whereby the article can be found out simply and quickly.

Conventionally, there exists no discriminating light-emitting apparatus in which, when a coded signal or a signal having a specific wavelength is issued, a light emitting section of a receiving device which receives the signal is turned on or off, to remark or make conspicuous a specific article on which the receiving device is mounted or rested.

Generally, in case where a vehicle is put or placed within, for example, dead darkness, or in case where a vehicle is placed within a location such as a wide parking zone, a sports ground or the like where plenty of vehicles are parked, the site of the vehicle is remembered for a time. But, after time has elapsed, or after other vehicles are moved so that parking circumstances change, it becomes much harder to locate one's own vehicle. The more the number of vehicles increases, the more this is true. In a further example where plenty of persons utilize a clog (shoe) cabinet having no door, or in case where plenty of persons take off their shoes at a location where there is no clog cabinet, it is extremely difficult to look for one's own shoes among plenty of shoes.

SUMMARY OF THE INVENTION

It is an object of the invention to provide a discriminating light-emitting apparatus which can simply, speedily and accurately find a specific article within dead darkness or among plenty of resembling articles.

According to the invention, there is provided a discriminating light-emitting apparatus comprising transmitting means capable of optionally setting a coded signal or a signal having a specific wavelength, and receiving means responsive only to the optionally coded signal or the signal having the specific wavelength issued from the transmitting means, to execute display, the receiving means being provided with at least one light emitting section which consists of a visible light-emitting diode or the like electrically connected integrally or separately.

A user of the discriminating light-emitting apparatus places the receiving means within dead darkness or among plenty of objects of the same type as each other, and mounts or rests the receiving means on or attaches it to, or on a particularly conspicuous adequate location or portion of a specific article which the user desires to find or locate. If the specific article is, for example, a vehicle or automobile, the receiving means is mounted on or is attached to, or is rested on a dashboard, a front board or a rear board within the vehicle, on a top of the vehicle, on an upper part of a wing-like antenna for automobile telephone, or the like. In cases where the receiving means is arranged on the outside of a vehicle, theft countermeasures must be considered. The location or portion on which the receiving means is mounted or rested may be locations where a signal from the transmitting means can reach the receiving means, and may be anywhere a user can view the light from the light emitting section. A resting or mounting method may be one in which the receiving means is simply put, or one in which the receiving means is stuck or pasted through an adhesive seal or the like. Further, other mounting tools such as, for example, magnets, sky carriers or the like may be used.

If, subsequently, a signal is sent from the transmitting means to the receiving means, the receiving means radiates the light emitting section in response to the signal. Accordingly, even in dead darkness, or even in a circumstance where there are plenty of articles of the same type as each other, it is possible for the user easily to find out an article he desires find, for example, a vehicle or automobile or the like.

Furthermore, as another example, in case where the receiving means is mounted on the vehicle, if the arrangement is such that a high mount stop lamp consisting of a light emitting diode serves as a light emitting section, and, when a signal is received by the receiving section, a drive signal is sent to a light emitting circuit of the lamp, the original or unique light emitting section is dispensed with, and the discriminating light-emitting apparatus comprises only the receiving section, because a car battery is utilized. Accordingly, it is possible to further reduced in size and lighten the entire apparatus, and to realize the apparatus at low cost.

In connection with the above, it is needless to say that, although description was made with a vehicle as an example, the invention is not limited to ordinary or general cars, buses, trucks, motor-bicycles and other vehicles, but can be applied also to other arrangements.

Furthermore, in case where a specific person is found among a crowd, in case where one's own shoes are found from among plenty of shoes, in case where own article, is found from among plenty of other baggage when one takes a trip, or the like, the discriminating light-emitting apparatus is convenient, and application thereof can be considered over a wide range.

The arrangement may be such that, as the transmitting either means for transmitting the coded signal or the signal having the specific wavelength, a radio transmitting means of small electric power type or weak electric power type, or a light transmitting means having the infrared light-emitting diode, for example, is used. As the receiving means for receiving the signal issued from the light transmitting means, the signal from the light transmitting means is received by the receiving means provided, for example, with a homodyne receiver or a heterodyne receiver, or is received by a receiving means provided with a light receiving element such as a pin photodiode, a phototransistor, a SIT phototransistor or the like. At that time, a receiving circuit issues or generates a drive signal to turn on a light emitting element such as, for example, a visible light-emitting diode or the like of the light emitting section. In this case, the arrangement may be such that an IC, a transistor, a relay circuit or the like is built in the receiving circuit to turn on and off the light emitting element.

It is preferable to use a SIT phototransistor as the light receiving element, because SIT phototransistors are remarkably superior in sensitive characteristic as compared with other transistors and pin photo-diodes or the like. If comparison is made with an image sensor that is the same optical sensor taken as an example, assuming that output signal current of 1 μA is obtained for one of MOS type, then an output more than 100 μA is obtained for one of SIT type. Furthermore, if comparison is made with respect to one of CCD type, the SIT phototransistor has a sensitive characteristic higher in further several figures. Also in this respect, the SIT phototransistor is an element capable of catching also a weak optical signal transmitted from a considerably far remote location as compared with other light receiving elements.

Moreover, in ease where an infrared light-emitting diode is used as a light emitting element in order to enable use in the daytime, it is adequate to use a light receiving element which is most superior in sensitive characteristic with reference to infrared wavelength. In this case, it can be expected for an element using Ge (germanium) to increase the sensitive characteristic, though it is possible also for a phototransistor using Si (silicon).

In connection with the above, in case where the used wavelength is infrared, if the transmitting element of the transmitting device and the receiving element of the receiving device are covered with a glass material or a resin material formed of a material cutting the wavelength of the visible light, or the entire apparatus is covered with a resin such as a plastic material having a red to dark-red color, or the like, it is possible to use the apparatus without erroneous operation due to the effects or influences of sunlight or the like.

With the above arrangement of the invention, according to the discriminating light-emitting apparatus of the invention, if a user mounts or rests the apparatus according to the invention on an adequate and particularly conspicuous location of a specific article which the user desires to find or locate, within dead darkness, or among plenty of articles which are the same type as each other, it is possible to rapidly and easily find the specific article. For example, the apparatus is useful for finding one's vehicle in, for example, a parking area or the like. Moreover, the apparatus is not limited to vehicles, but is convenient also in case where a bag or the like is found out among many bags during traveling, or the like. Application of the apparatus extends over a wide scope.

DESCRIPTION OF THE EMBODIMENTS

Figure 1:
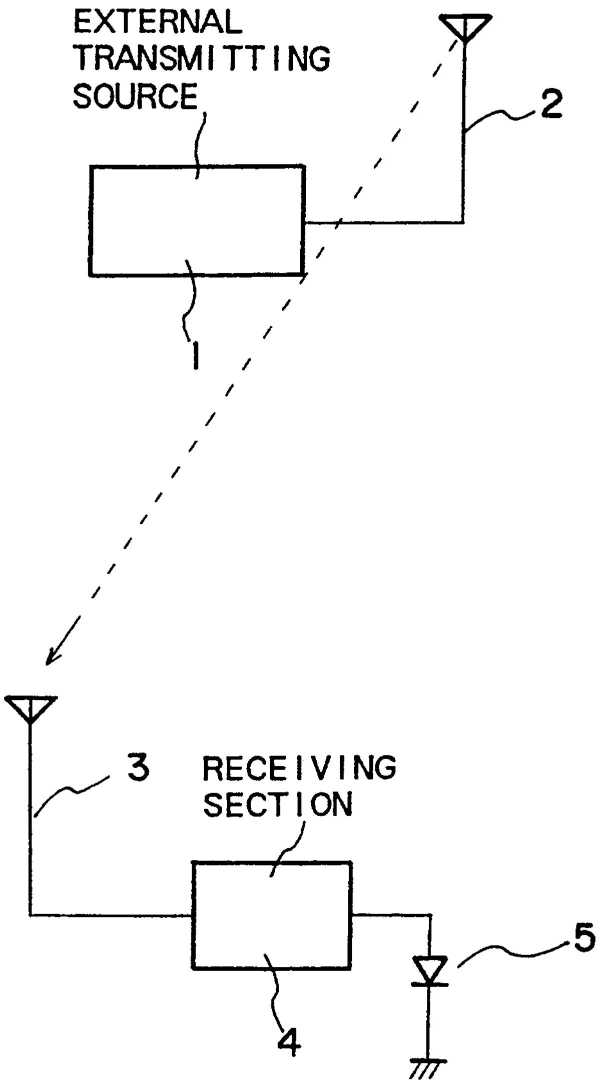
FIG. 1 is a schematic view showing an embodiment of a discriminating light-emitting apparatus according to the invention.

Referring first to FIG. 1, there is schematically shown an embodiment of a discriminating light-emitting apparatus according to the invention. The reference numeral 1 denotes an external transmitting source such as a radio or wireless light-emitting unit of small-electric-power type, or the like; and 2, an antenna. The external transmitting source 1 and the antenna 2 cooperate with each other to form a transmitting device. If a used frequency is within a VHF band∼UHF band, a wave can reach within a range of the order of 10 m∼200 m, if an output is within 1 mW to 10 mW.

The reference numeral 3 denotes an antenna of a receiving section to be described subsequently; 4, a receiving section; and 5, a light-emitting section such as a visible light-emitting diode, or the like. The antenna 3, the receiving section 4 and the light-emitting section 5 cooperate with each other to form a receiving device. When the visible light-emitting diode 5 receives a signal from the external transmitting source 1, the diode 5 is turned on or off. The receiving section 4 should sufficiently be higher in sensitivity than the external transmitting source 1, and it is advisable that the receiving section 4 is of homodyne type or of heterodyne type.

In order to further facilitate operation for specifying an article to be discriminated, in this embodiment, a modulator and a demodulator should be mounted respectively on the external transmitting source 1 and the receiving section 4, respectively. Specifically, optional characters or numerals are combined with each other so as to be coded and modulated on a modulating side, while only a coded signal is responded to turn on and off the visible light-emitting diode on the demodulating side. With such arrangement, the receiving section 4 responds only to a signal of a specific code and, therefore, it is possible to prevent radio interference, and effects or influence of noises. As a result, the operation for specifying the article to be discriminated can be facilitated. Furthermore, similar advantages can be obtained if a frequency or a wavelength of the external transmitting source 1 and the receiving section 4 are optionally selected.

Figure 2:
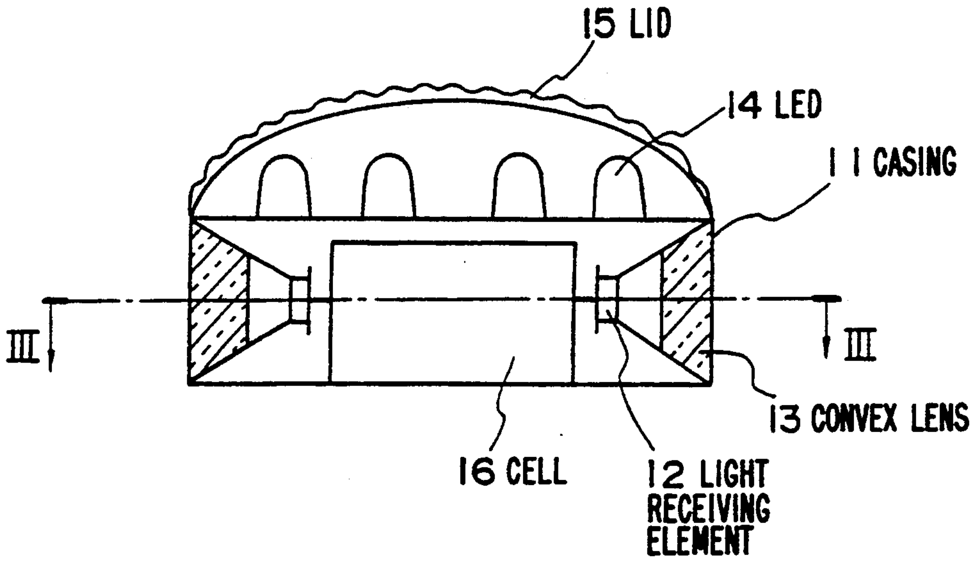
FIG. 2 is a schematic longitudinal cross-sectional view showing a receiving device according to another embodiment of the invention.
Figure 3:
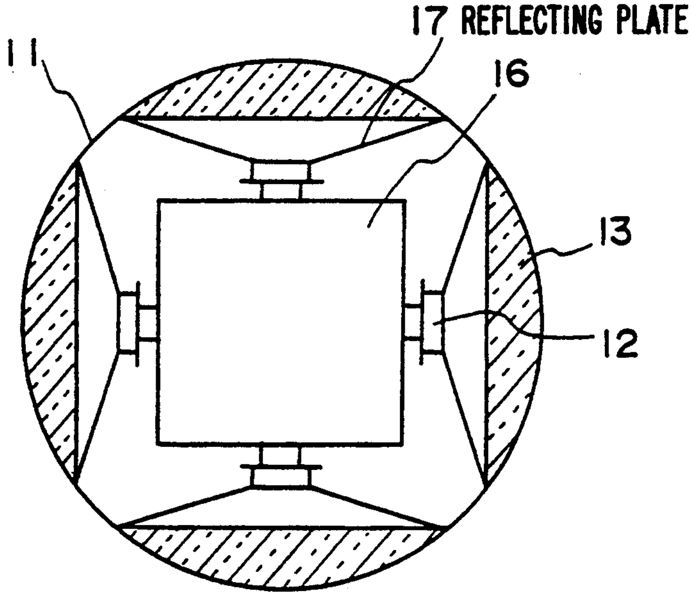
FIG. 3 is a cross-sectional view taken along a line III—III in FIG. 2.

FIG. 2 is a schematic longitudinal cross-sectional view of a receiving device according to another embodiment of the invention; FIG. 3, a cross-sectional view taken along a line III—III in FIG. 2; and FIG. 4, a schematic perspective view of a transmitting device according to the aforesaid other embodiment.

In FIG. 2, the reference numeral 11 denotes a cylindrical casing. The cylindrical casing 11 has a side surface on the inside of which a plurality of light receiving elements 12 such as, for example, SIT phototransistors or the like are built in such that light from the exterior can reach the light receiving section through convex lenses 13. A plurality of visible light-emitting diodes 14 are built in on an upper portion of the casing 11. A closure of lid 15 having a generally hemispherical configuration having a lens effect covers the circumference of the visible light-emitting diodes 14. Moreover, a cell 16 for radiating the light-emitting diodes 14 is built in at a center of the casing 11.

As shown in FIG. 3, four (4) light receiving elements 12 are arranged concentrically with the casing 11 and facing outwardly. The convex lenses 13 and mirror-surface reflecting plates 17 for enhancing light-receiving sensitivity are arranged respectively in front of the light-receiving elements 12.

In connection with the above, the arranging method of the light receiving elements 12 should not be limited to the above-described, but may be any one arranging method such that an entire periphery of the casing 11 is covered, such as the light receiving elements 12 being closely arranged on a side surface of the casing 11, or the like, without the use of the reflecting plates 17. Further, a configuration of the casing 11 should not be limited to the cylindrical configuration. Furthermore, the arrangement may be such that a light receiving section and a light emitting section are formed separately from each other.

Figure 4:
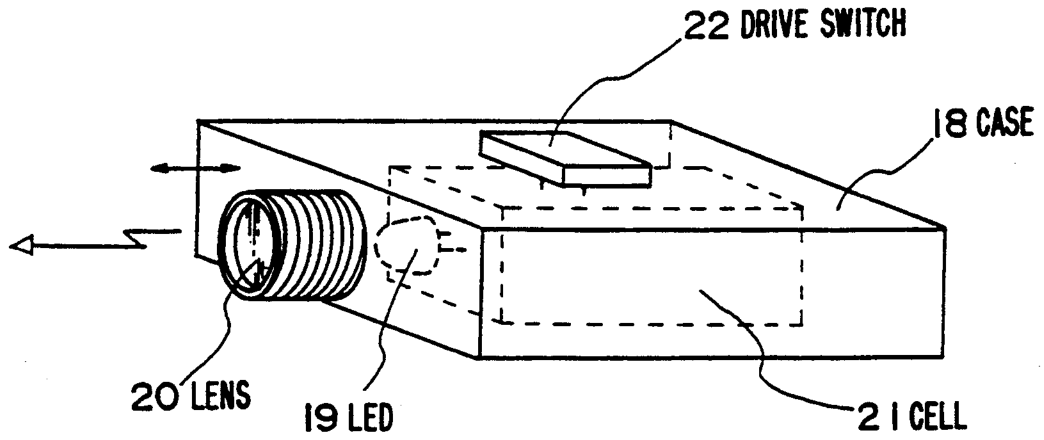
FIG. 4 is a schematic perspective view showing a transmitting device of the aforesaid other embodiment.

As shown in FIG. 4, the transmitting device is arranged such that an infrared light-emitting diode 19 that is a transmitting source, a convex lens 20 movable along an optical-axis direction for regulating a light emitting angle, a cell 21, and a drive switch 22 are received within a case 18. The lens 20 has an effect that, when searching or seeking a vehicle or the like at a relatively near location, a light-projecting angle is enlarged or widened whereby an optical signal can be sent within a wide range or area even if a light projecting strength becomes relatively weak and, therefore, a receiving device is caught or seized for a short period of time, and an optical signal can be transmitted to the caught receiving device. Moreover, in case where an optical signal is sent over a far or remote distance, a light projecting angle is restricted whereby the light projecting strength can be raised. Thus, it is possible to improve receiving accuracy.

Figure 5:
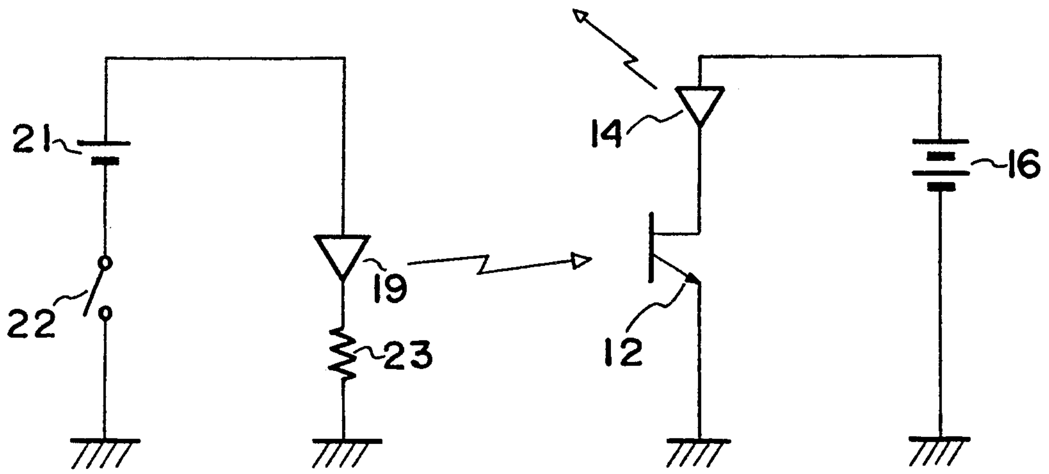
FIG. 5 is a basic circuit view of the transmitting device and the receiving device of the aforementioned other embodiment.

FIG. 5 is a view showing fundamental or basic circuits of the transmitting device and receiving device of the present embodiment respectively. The circuit of the transmitting device comprises a cell 21 for radiating the infrared light-emitting diode 19, a switch 22, a limiting resistance 23 and the like. Further, the circuit of the receiving device comprises a light receiving element 12 and the cell 16 for radiating the light emitting diode 14.

Figure 6:
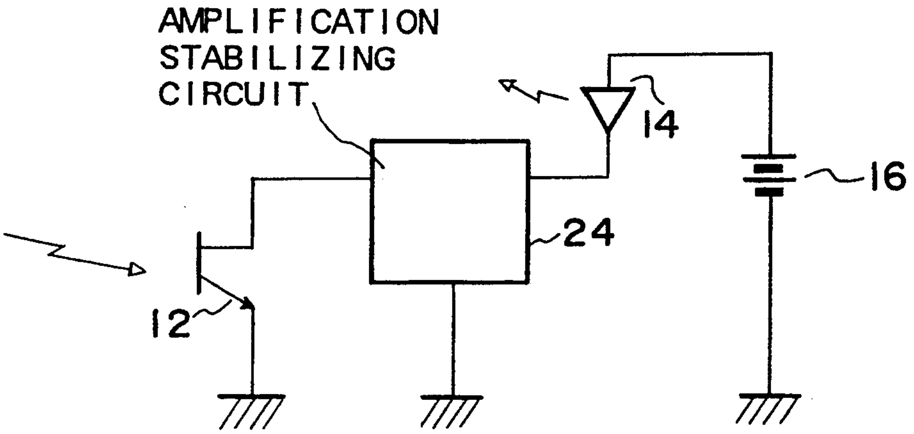
FIG. 6 is a view showing an applied example or a modification of the receiving device.

FIG. 6 is a view showing a modified example of the receiving circuit. This example builds therein an amplification stabilizing circuit 24 for supplying an always constant output (without relying upon an input light quantity) to the light emitting diode 14 of the light emitting section, in order to prevent current flowing through the light emitting diode 14 from being reduced in case where an input optical signal is weak.

In connection with the above, a hold circuit of an output to the light emitting diode 14 is built in in series with the stabilizing circuit, whereby it is possible to send out an output signal continuously if a signal is once inputted even if the input signal is received only for a moment. Furthermore, a timer circuit is built in whereby operation of the hold circuit can be limited to a predetermined period of time.

Figure 7:
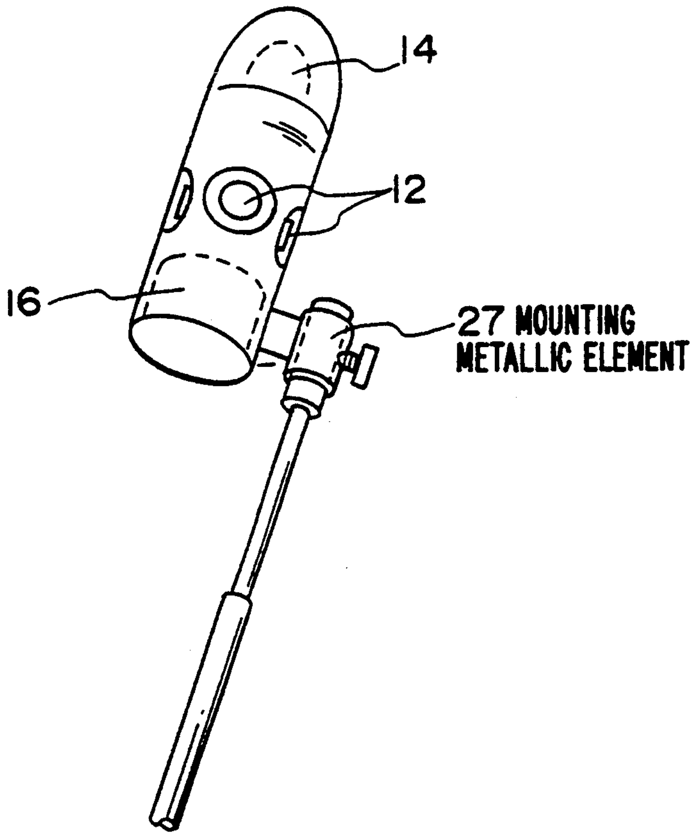
FIG. 7 is a perspective view showing an example of how to mount the receiving device.

FIG. 7 is a view showing an example of a structure or arrangement for mounting the receiving device. The mounting arrangement is a case where an antenna for a radio of a vehicle, for example, is used as a mounting section. Naturally, utilization of the antenna enables the receiving device to be mounted at a location higher than a ceiling of the vehicle. As a method of mounting the receiving device, there is a method in which the receiving device is mounted through a leaf spring which is put in the antenna, a method in which the receiving device is mounted through a mounting metallic element 27 of type in which the mounting metallic element 27 is fitted about the antenna and is fixedly mounted thereto by screws, and the like. In this case, also, the arrangement may be such that only the receiving section is mounted on the antenna, and the light emitting section is mounted by utilization of a high-mount stop lamp, or the like.

Figure 8:
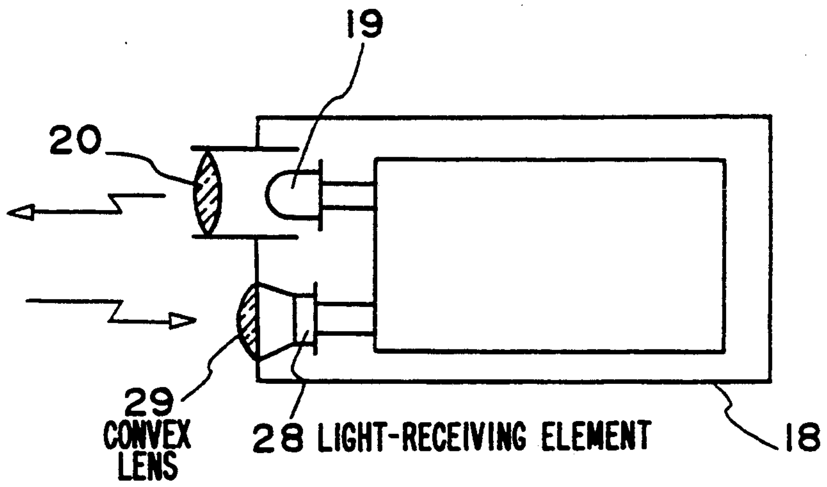
FIG. 8 is a schematic cross-sectional view showing a transmitting device according to still another embodiment.
Figure 9:
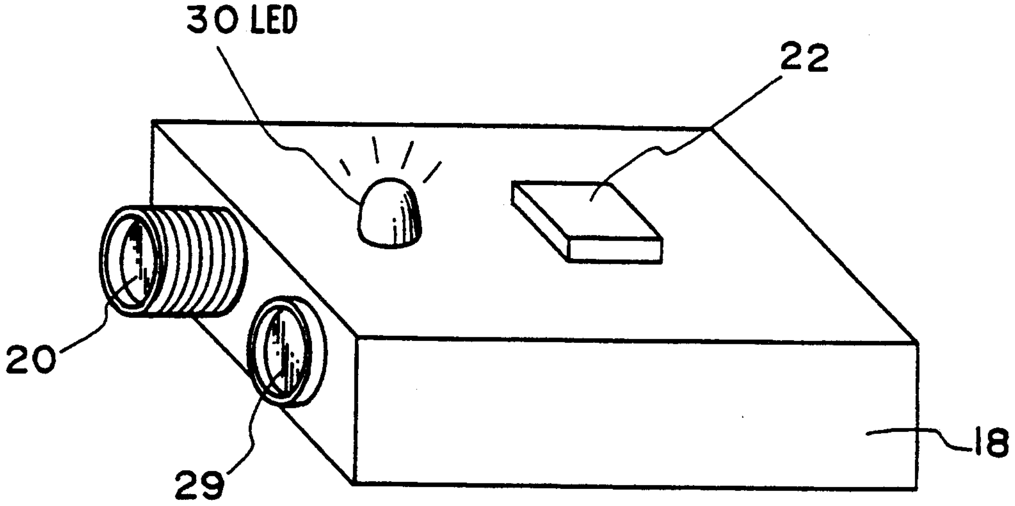
FIG. 9 is a schematic perspective view of the transmitting device illustrated in FIG. 8.

FIGS. 8 and 9 are a schematic cross-sectional view and a schematic perspective view showing an embodiment in which a light receiving element is also mounted on the side of the transmitting device. As shown in FIG. 8, the arrangement is such that a light receiving element 28 is arranged adjacent to the light emitting element 19, and the light receiving element 28 is received within the case 18 in parallel relation to the infrared light emitting diode 19 through a convex lens 29.

Moreover, as shown in FIG. 9, in case where a radiated optical signal is reflected and is returned, a light receiving element 28 on the side of the transmitting device catches the signal so that a light emitting diode 30 in front of the switch 22 is turned on and off. A circuit according to the present embodiment is similar to the transmitting circuit and the receiving circuit illustrated in FIG. 5. If the circuit according to the present embodiment is used, even in case where vehicles high in height such as wagon vehicles, trucks and the like are parked in front of and in rear of, and on the left- and right-hand sides of one's own vehicle, and light is obstructed or hindered by the vehicles so that the light does not reach the receiving device which is mounted on the objective vehicle, light reflected from the vehicles high in the ceiling is caught by the receiving element 29 on the side of the transmitting device, and turning-on and -off of the light emitting diode 30 inform that there is an obstacle. Accordingly, even if a light emitting direction is oriented toward directions other than the direction toward the light emitting diode 20, if there is no radiation from the receiving device, it is possible to inform other vehicles that there is own vehicle, in a parking direction of the vehicle high in height. In this manner, if the light receiving element 29 is built in also on the side of the transmitting device, identification of the objective article is facilitated and is made rapidly.

What is claimed is:

1. A discriminating light-emitting apparatus comprising:

transmitting means for optionally setting a coded optical signal, said transmitting means having a drive switch; and receiving means having a light receiving element responsive only to the optionally coded optical signal issued from said transmitting means and a light emitting section for displaying an indication of receipt of the coded optical signal;

wherein said transmitting means issues the optical signal upon turning-on of the drive switch, said receiving means turns on when said light receiving element receives the optical signal, and said indication of receipt of the optical signal by said light emitting section is displayed by turning on said at least one light emitting section for at least a predetermined time period.

2. A discriminating light-emitting apparatus according to claim 1, wherein said transmitting means is provided also with a light emitting section which is responsive to a signal issued from said transmitting means, to execute display, in case where the signal is reflected and is returned.

3. A discriminating light-emitting apparatus according to claim 1, wherein a light emitting section for an object on which said receiving means is arranged is also said light emitting section of said receiving means, and an output signal from said light emitting element of said receiving means is supplied to a light emitting circuit of said light emitting section as a drive signal.

4. A discriminating light-emitting apparatus according to claim 1, wherein said receiving means includes a plurality of light receiving elements which are so arranged as to cover an entire periphery of said receiving means.

5. A discriminating light-emitting apparatus according to claim 1, wherein said transmitting means and said receiving means are covered respectively by materials which cut light having a wavelength other than the light issued by said light transmitting means.

6. A discriminating light-emitting apparatus according to claim 1, wherein said transmitting means includes a light emitting element, and said discriminating light-emitting apparatus further includes a lens movable along an optical-axis direction which is arranged in front of said light emitting element of said transmitting means, so that a light projecting direction of said light emitting element is adjustable.

7. A discriminating light-emitting apparatus according to claim 1, wherein said transmitting means has a light emitting element, and said light emitting element of said transmitting means is an infrared light emitting diode.

8. A discriminating light-emitting apparatus according to claim 1, wherein said receiving means includes a plurality of light receiving means, and said light emitting elements of said receiving means are SIT phototransistors.

9. A discriminating light-emitting apparatus according to claim 1, wherein said light emitting section is a visible light emitting diode.

10. A discriminating light-emitting apparatus according to claim 1, wherein said receiving means is at least one of a homodyne receiving unit and a heterodyne receiving unit.

11. A discriminating light-emitting apparatus according to claim 1, wherein said receiving means is a receiving unit provided with a light receiving element which is at least one of a pin photo-diode, a phototransistor, and a SIT phototransistor.

12. A discriminating light-emitting apparatus according to claim 1, wherein said receiving means is a receiving unit provided with a light receiving element which is an infrared light-emitting diode, and wherein said light receiving element is an element comprising germanium.

13. A discriminating light-emitting apparatus according to claim 1, wherein a used wavelength is infrared, wherein said transmitting means has a transmitting element and said receiving means has a receiving element, and wherein said transmitting element and said receiving element are covered with at least one of a glass material and a resin material, which is formed of a material which cuts a wavelength of visible light.

14. A discriminating light-emitting apparatus according to claim 1, wherein said transmitting means includes a case, and an infrared light-emitting diode that is a transmitting source, a convex lens movable along an optical axis, for regulating a light emitting angle, a cell, and a drive switch, which are built in said case.

15. A discriminating light-emitting apparatus comprising:

transmitting means for optionally setting optical signals having a specific wavelength, said transmitting means having a drive switch; and receiving means responsive only to an optical signal having the specific wavelength, issued from said transmitting means, to perform a display, said receiving means having at least one light emitting section;

wherein said transmitting means issues the optical signal upon turning-on of the drive switch, said receiving means turns on when said light receiving element receives the optical signal, and said display indicating receipt of the optical signal by said light emitting section is performed by turning on said at least one light emitting section for at least a predetermined time period.

16. A discriminating light-emitting apparatus according to one of claims 1, 5–7, 14 or 15, wherein said transmitting means is further provided with a light receiving element for receiving the optical signal which is issued by said transmitting means and thereafter reflected and returned thereto, and with a light emitting section whose receiving means is turned on by the output signal from the light receiving element to display an indication of receipt of the optical signal.

17. A discriminating light-emitting apparatus including receiving means for receiving an optical signal and transmitting means for transmitting an optical signal, said receiving means comprising:

a cylindrical casing having a power source for emitting a visible light-emitting diode built in a central portion thereof;

a plurality of light receiving elements arranged at an inside of said casing such that said light receiving elements are in concentrical relation to said casing and face outwardly;

a conical mirror-surface reflecting plate for guiding light from outside to said light receiving elements and a convex lens for enhancing light-receiving sensitivity, arranged respectively in front of said light receiving elements; and a generally hemispherical lid having a lens effect covering a circumference of a plurality of visible light-emitting diodes arranged on an upper portion of said casing;

said transmitting means comprising:

a case within which are received a power source for emitting an infrared light-emitting diode and a drive circuit;

a manual-operating drive switch disposed on an upper surface of said case;

a convex lens projecting from a side surface of said case and movable along an optical-axis direction for regulating a light emitting angle; and an infrared light-emitting diode for issuing an optical signal through said convex lens; and wherein the optical signal issues by turning on said drive switch of said transmitting means, said light receiving element reacts and turns on in response to the optical signal thereby supplying electric current to said visible light-emitting diodes to radiate the diodes.

18. A discriminating light-emitting apparatus according to claim 17, including an amplification stabilizing circuit for supplying a substantially constant output without relying upon an input light quantity, to said light-emitting diode.

19. A discriminating light-emitting apparatus according to claim 17, wherein said receiving means is mounted on an antenna of a radio for a vehicle.

20. A discriminating light-emitting apparatus according to claim 17, wherein said transmitting means comprises a resistor, an infrared light-emitting diode, a power source and a switch connected to an electrical circuit in a series and an optical signal issued by said infrared light-emitting diodes is radiated by electric current in said circuit; and said receiving means comprises a light receiving element, a visible light-emitting diode and a power source connected to an electric circuit in a series, and said light receiving element reacts in response to the optical signal from said transmitting means to turn on said circuit, thereby radiating a light emitting section of said visible light-emitting diode.

21. A discriminating light-emitting apparatus according to one of claims 18, 19, 17, or 20, wherein a light receiving element is disposed adjacent to said light emitting element of said transmitting means and said light receiving element is arranged therein in parallel relation to said infrared light-emitting diode through convex lenses, respectively, the optical signal issues from said transmitting means is thereafter returned and received by said light receiving element of said transmitting means, to turn on and off said light-emitting diode.

* * * * *